No. 678,736. Patented July 16, 1901.
S. F. HUGHES.
TREADLE GUIDE FOR CULTIVATORS.
(Application filed Feb. 27, 1901.)
(No Model.)

Witnesses
James S. Smith
William B. Thomas

Inventor
Samuel F. Hughes,
By Edwin Guthrie.
Attorney

UNITED STATES PATENT OFFICE.

SAMUEL F. HUGHES, OF FORT MADISON, IOWA.

TREADLE-GUIDE FOR CULTIVATORS.

SPECIFICATION forming part of Letters Patent No. 678,736, dated July 16, 1901.

Application filed February 27, 1901. Serial No. 49,084. (No model.)

*To all whom it may concern:*

Be it known that I, SAMUEL F. HUGHES, a citizen of the United States, residing at Fort Madison, in the county of Lee and State of Iowa, have invented certain new and useful Improvements in Treadle-Guides for Cultivators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to treadles-guides for cultivators, more particularly to devices applicable to straddle-row cultivators by means of which the gangs of plows may be moved to either side of the direct line in which they would normally travel as the machine is drawn along.

The object of my invention is to improve and simplify the arrangement and formation of the various parts of a device for accomplishing the sidewise movement mentioned and to place the treadle and other mechanism immediately related thereto in the most convenient operative positions.

Each constituent element of my invention is described in detail and its individual office, together with the mode of operation of the whole, fully explained hereinafter.

Figure 1:
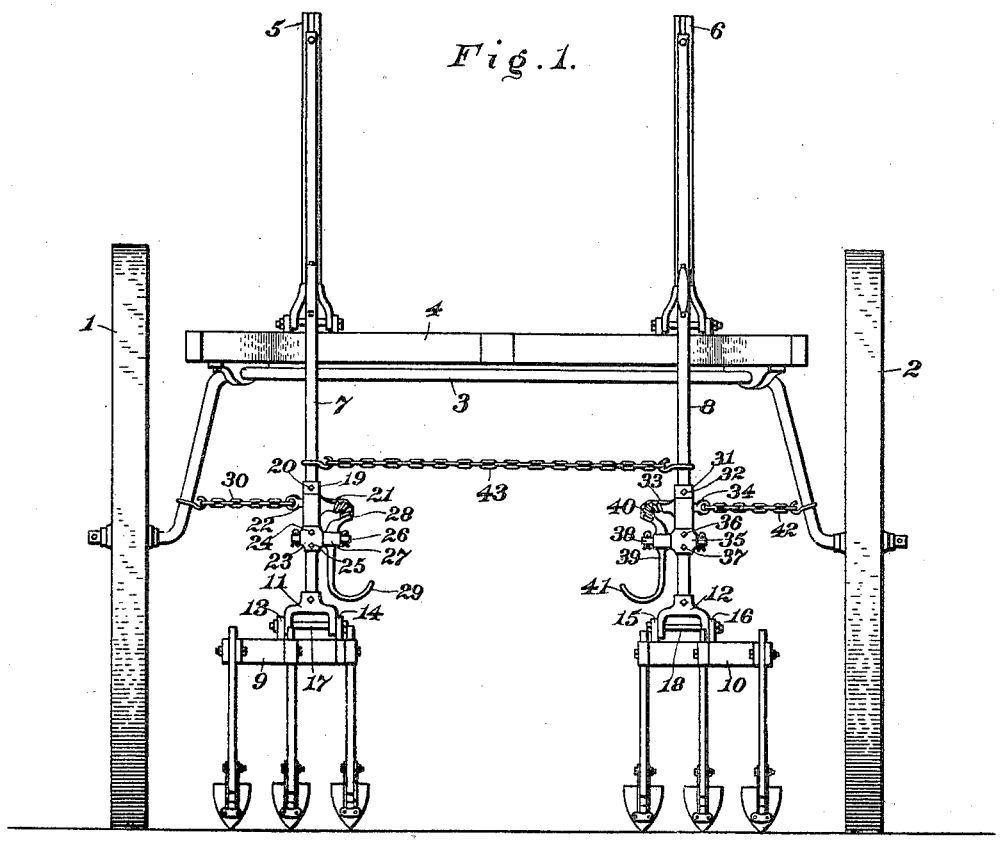
Figure 2:
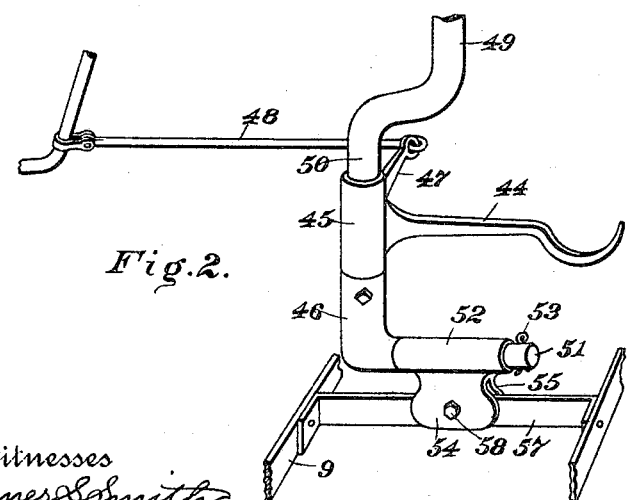
Figure 3:
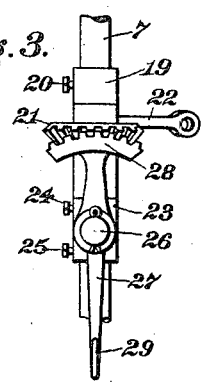

Of the accompanying drawings, throughout which like numerals designate like parts, Figure 1 represents a rear view of certain portions of a straddle-row cultivator of usual construction, showing my invention applied thereto and exhibiting its position with respect to those portions. Fig. 2 represents a modified form of my invention detached, and Fig. 3 is an enlarged side view of the gearing and attachments shown in Fig. 1.

Considering the drawings, numerals 1 and 2 mark the wheels of a cultivator.

3 designates the arched axle; 4, the frame supported by the axle; 5 and 6, the pivoted arms or booms arising from the frame of the machine, and numerals 7 and 8 mark the hanging standards or rods pivotally suspended from the upper ends of the pivoted arms 5 and 6. The office of the hanging rods is to support the plow-beams 9 and 10. Each rod has at its lower extremity a pivotal connection with the beam or frame to which the plows are attached.

Together with the plows the elements mentioned above are all of the customary pattern and call for no special description.

Each of the hanging rods at its lower extremity is provided with a pronged head. These heads are designated by numbers 11 and 12, and they are secured to the rods. The tips of the prongs are pierced with corresponding bolt-holes, and the prongs are of such width as to fit movably between the ears 13 and 14, projecting upwardly from beam 9, and the ears 15 and 16 upon beam 10. Bolts 17 and 18 pivotally couple the prongs and ears, as shown, and the plow-beams are thus joined to the hanging rods and may be raised by them in the ordinary manner when desired.

The preferred form of my invention is illustrated in Fig. 1. About hanging rod 7 is a collar 19, held in place upon the rod by a set-screw 20. Inclosing the rod, immediately beneath collar 19, is the hub of a segmental gear 21, and projecting from the hub is an arm 22, provided at its outer end usually with an eye or hook. Next beneath the hub of gear 21 is the sleeve 23, the position of which is fixed upon the rod by the set-screws 24 25, and passing through the sleeve and rod is the pin 26, which forms a bearing for the foot-lever 27. At the upper end the lever possesses the geared arc 28 and at the lower end the treadle or foothold 29. The eye or hook at the end of the arm 22 is connected with the bend of the axle, as shown, by a rod or chain 30. If, therefore, the foot of the lever be forced forward, the interposed gearing causes the arm 22 to draw upon the chain, which results in directing the movement of hanging rod 7, and consequently the beam 9 and its gang of plows, to the left.

The hanging rod 8 carries duplicates of the geared and connected parts just described above. The collar is marked 31, the set-screw 32, the geared segment 33, its projecting arm 34, the sleeve 35, the set-screws by which it is secured to the rod 36 and 37, and the transverse pin 38. The foot-lever bears the reference-number 39, its toothed arc meshing with the geared segment numbered 40, and at its lower end the foothold is referred to by number 41. A forward push of the foot in foothold would draw upon chain 42, connecting-arm 34, and the bend of the axle, and the hanging rod 8, with the beam 10 and its gang of plows, will move to the right.

In Fig. 1 it will be noted that a chain 43 joins the hanging rods usually, but not necessarily, above the collars 19 and 31. It is therefore evident that the hanging rods and their attached plows must both move toward the same side. When the treadle on the right is operated, the plows move to the right, and they are brought back into the normal middle position or moved to the left by the treadle upon the left side.

Fig. 3 more clearly illustrates the gearing upon the left of Fig. 1, and as both sets of gears are alike this figure may be regarded as illustrating either set.

It is often desirable to accomplish the sidewise movement sought by a modification of my invention shown in Fig. 2. A foot-lever 44 extends horizontally upon the right side of the hanging rod from a hub 45 encircling the rod. A coupling 46 keeps the hub from sliding down the rod. At right angles to lever 44 an arm 47 projects from the hub, and a rod 48 connects the end of the arm and the bend of axle 3, as before. The rod 48 is substituted for the usual chain connections when it is desired to operate the gangs independently, each hanging rod being similarly equipped with a foot-lever, hub, arm, and rod, as stated. It will be noted that the hanging rod 49 used with this modification has an outward bend 50 and a vertical portion below the bend. The companion rod in a cultivator would possess a like bend extending in the opposite direction. The bent rods bring the footholds in convenient position for the rider.

In Fig. 2 the connection with the plow-beam 9 is also of modified form and is in the nature of a universal joint. Coupling 46 is an L-shaped piece or casting and has secured to it and projecting at right angles with the hanging rod a short rod 51 of about the same size as the other rods, and the short rod 51 passes through the tubular portion of a connection 52 and is retained by a cotter 53. The connection 52 is movable upon rod 51, and it has two downwardly-extending sides 54 and 55, which straddle a cross-brace 57 of plow-beam 9, and the sides are pivotally secured to the brace by the bolt 58. In this construction the plows are permitted to adjust themselves to all inequalities of level of the ground. Thus the tubular portion encircling the rod 51 allows the front or rear of the beam to rise or fall, and the pivot-bolt 58, through the sides 54 and 55, makes it possible for either side of the beam to tilt when necessary.

I am aware that there are a number of treadle-guides constructed and used, and I do not claim a device broadly for that purpose.

What I claim, and seek to secure by Letters Patent of the United States, is—

1. In a treadle-guide for cultivators, the combination of the hanging rods, plow-beams pivotally coupled to said rods, foot-levers pivotally supported upon the said rods, and devices connecting the said foot-levers and relatively fixed portions of the cultivator whereby the said rods and beams may be moved toward the sides, substantially as described.

2. In a treadle-guide for cultivators, the combination of the hanging rods, plow-beams pivotally coupled to said rods, foot-levers pivotally supported upon the said rods, the said foot-levers having geared portions, geared segments having hubs pivotally supported upon the said rods, the said segments meshing with the geared portions of the said foot-levers, and devices connecting the hubs of the said segments and relatively fixed portions of the cultivator whereby the said rods and beams may be moved toward the sides, substantially as described.

3. In a treadle-guide for cultivators, the combination of the hanging rods, plow-beams pivotally connected to said rods, foot-levers pivotally supported upon the said rods, the said foot-levers having geared portions, geared segments having hubs pivotally supported by the said rods, the said segments meshing with the geared portions of the said foot-levers, arms projecting from the hubs of the said segments, and connections between the said arms and relatively fixed portions of the cultivator whereby the said rods may be moved toward the sides, substantially as described.

4. In a treadle-guide for cultivators, the combination of the hanging rods having lateral bends and vertical portions below the said bends, plow-beams pivotally joined to the lower ends of the said rods, foot-levers having hubs pivotally supported upon the said vertical portions of the rods below the bends, and connections between the said hubs and relatively fixed portions of the cultivator whereby the said hanging rods and plow-beams may be moved toward the sides, substantially as described.

5. In a treadle-guide for cultivators, the combination of a hanging rod having a lateral bend and vertical portion below the said bend, the L-shaped coupling 46 secured to the said vertical portion of the hanging rod below the bend, the rod 51 projecting from the coupling at right angles to the hanging rod, the connection 52 having the downwardly-extending sides and a tubular portion encircling the rod 51, and a plow-beam pivotally joined to the said connection 52, substantially as described.

In testimony whereof I affix my signature in presence of witnesses.

SAMUEL F. HUGHES.

Witnesses:
WILLIAM H. NEWLON,
LIZZIE HYDE,
SABERT M. CASEY.